United States Patent
Crosby et al.

(10) Patent No.: US 6,522,742 B1
(45) Date of Patent: Feb. 18, 2003

(54) SYSTEM AND METHOD FOR NORMALIZING PRIVATE EXCHANGE OUTPUT

(75) Inventors: Gary J. Crosby, Bristol (GB); Ram Gupta, Cupertino, CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 09/385,201

(22) Filed: Aug. 30, 1999

(51) Int. Cl.[7] .......................... H04M 7/00; H04M 1/64
(52) U.S. Cl. ...................... 379/219; 379/88.22
(58) Field of Search ................ 379/88.22, 219

(56) References Cited

U.S. PATENT DOCUMENTS

| | | | | |
|---|---|---|---|---|
| 6,246,752 B1 | * | 6/2001 | Bscheider et al. | 379/88.22 |
| 6,252,946 B1 | * | 6/2001 | Glowny et al. | 379/88.22 |
| 6,252,947 B1 | * | 6/2001 | Diamond et al. | 379/88.22 |

* cited by examiner

*Primary Examiner*—Ahmad F. Matar
*Assistant Examiner*—Thjuan P Knowlin
(74) *Attorney, Agent, or Firm*—Chapin & Huang, L.L.C.; Barry W. Chapin, Esq.

(57) ABSTRACT

A system and method are provided for generating normalized events from nonstandard computer telephony interface (CTI) events generated by various private exchanges or telephone switches made by various manufacturers. In one embodiment, the system of the present invention includes a processor coupled to a local interface, a memory coupled to the local interface with normalization logic stored in the memory, the normalization logic being executed by the processor. The normalization logic generates a number of normalized events relative to the operation of a call center based upon non-standard CTI events received from the specific private exchange employed. In this regard, the normalization logic includes event normalization logic to generate at least one normalized event from a non-standard CTI event. The normalization logic also includes information normalization logic to add a missing amount of information to the normalized event, thereby generating an information normalized event, and temporal normalization logic to generate at least one missing normalized event upon detecting an out of sequence information normalized event.

21 Claims, 6 Drawing Sheets

SYSTEM AND METHOD FOR NORMALIZING PRIVATE EXCHANGE OUTPUT

TECHNICAL FIELD

The present invention is generally related to the fields of telephony and of customer contact managers, and, more particularly, is related to a system and method for normalizing a non-standard computer telephony interface (CTI) event output from a private exchange in a call center.

BACKGROUND OF THE INVENTION

Many companies, governmental agencies, and other organizations provide various customer support functions relative to their activities. For example, companies typically sell products or services to consumers or other entities that require continued direction involvement by the Company to facilitate the effective use of the product or service by the consumer. Likewise, governmental agencies or other similar organizations may have to provide instructions to citizens who seek to satisfy their obligations to the organizations. These support functions often result in a centralized or distributed support organization that can be contacted by consumers who seek help with regard to the product or service in question.

These centralized or distributed support organizations may often be established as a call center. A call center may include a number of agents who are linked via a private telephone network or private exchange (PBX) that will handle multiple calls from various consumers and answer questions and provide service and support. Typically, these agents record the nature and substance of their activities with regard to individual consumers to create a record of the exchange for legal purposes and for other reasons.

More recently, data processing systems and computer networks are employed in call centers to aid in the exchanges between the agents and the consumers. For example, there is a desire in many call centers that the same agent handle repeated calls by the same consumer so that the agent can most efficiently handle a problem since the agents is aware of the call history. In addition, there is a desire to keep a record of all calls from a particular consumer on the database so that those records can be easily recalled and examined by the agent in question or can be examined by new agent who can then be appraised of a particular ongoing crisis or problem. The data processing systems and computer networks also facilitate displaying the records of a particular consumer on a screen of an agent that deals with the particular consumer. Also, there is a desire that calls by consumers are answered quickly so that consumers do not wait on hold for unreasonable amounts of time, thereby discouraging the consumer from obtaining the needed service and support.

The private exchanges in the call centers often provide information relative to the particular consumer calling as well as other information relative to the state of the telephone system in the call center. However, there are several different makes of private exchanges available on the market and each one generally employs its own communications protocol with which to interface with the data processing systems and computer networks of call centers. This results in significant difficulty in interfacing the data processing systems and computer networks with the various private exchanges to facilitate the flow of data on the computer network based upon the telephony activity within the call center.

SUMMARY OF THE INVENTION

The present invention provides a system and method for generating standardized events from non-standard computer telephony interface (CTI) events generated by various private exchanges or telephone switches made by various manufacturers. In one embodiment, the system of the present invention includes a processor coupled to a local interface, a memory coupled to the local interface with normalization logic stored in the memory, the normalization logic being executed by the processor. The normalization logic generates a number of normalized events relative to the operation of a call center based upon non-standard CTI events received from the specific private exchange employed. In this regard, the normalization logic includes event normalization logic to generate at least one normalized event from a non-standard CTI event. The normalization logic also includes information normalization logic to add a missing amount of information to the normalized event, thereby generating an information normalized event, and temporal normalization logic to generate at least one missing normalized event upon detecting an out of sequence information normalized event.

In other embodiments, the normalization logic may be implemented in hardware, software, firmware, or a combination thereof. One hardware implementation includes, for example, a dedicated logical circuit comprised of a network of logical gates and other components.

The present invention can also be viewed as providing a method for generating standardized events from non-standard CTI events generated by various private exchanges or telephone switches made by various manufacturers. In this regard, the method can be broadly summarized by the following steps: generating at least one normalized event from a non-standard CTI event; adding a missing amount of information to at least one normalized event, thereby generating an information normalized event; and generating at least one missing normalized event upon detecting an out of sequence information normalized event.

The present invention provides a distinct advantage in that it allows an optimum logical structure to convert non-standard CTI events from various private exchanges (PBXs) into normalized events that can then be employed in the efficient operation of a call center. Thus, the computer network software that controls the flow of information and interworkings within a computer call center can easily adapt to the non-standard CTI protocol of any PBX. In addition, the normalized protocol facilitates call-contact data correlation among multiple call centers.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
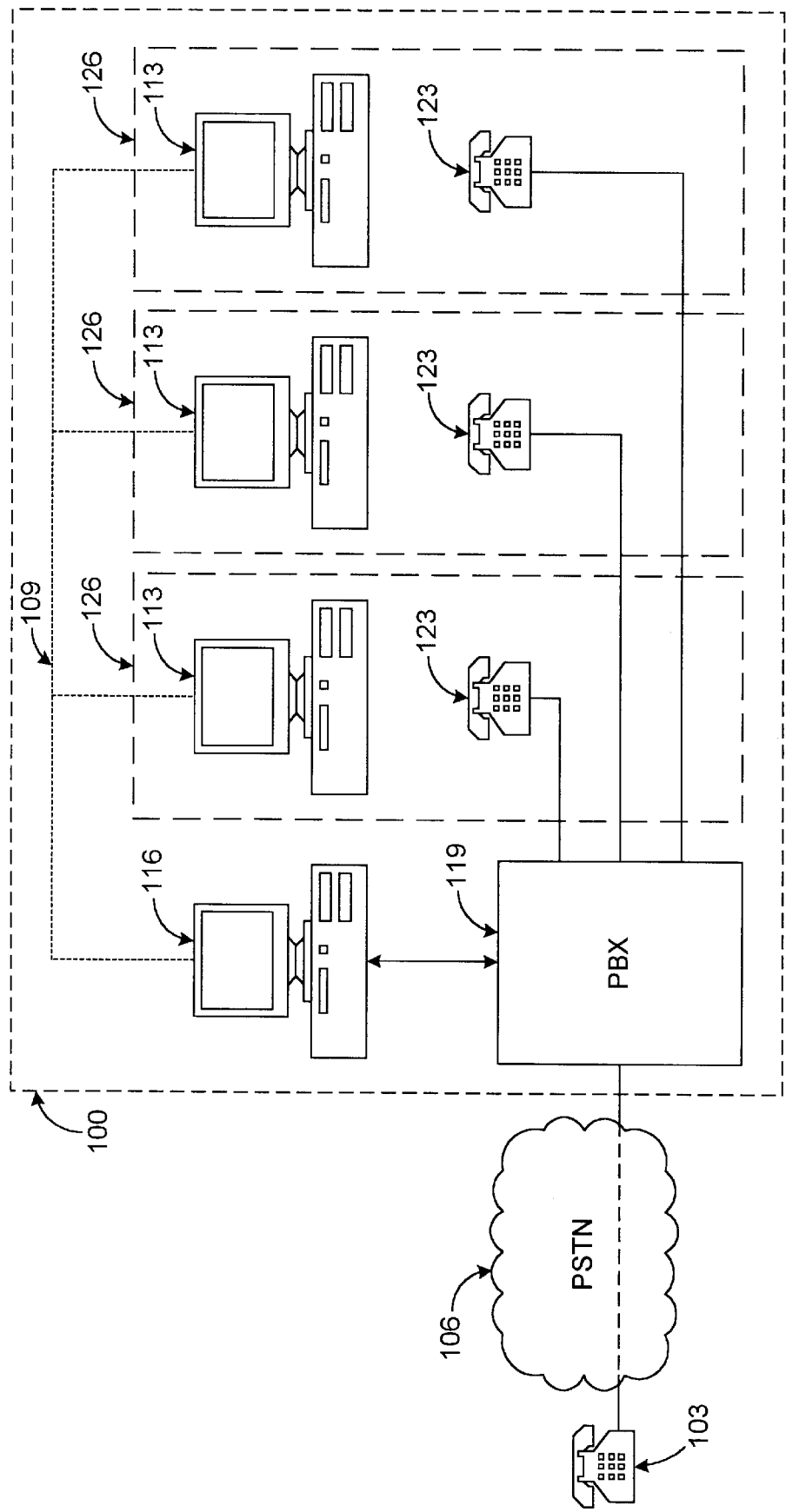
FIG. 1 is a block diagram of a call center according to an embodiment of the present invention.

With reference to FIG. 1, shown is a call center 100 that is linked to an outside telephone 103 through the public switched telephone network (PSTN) 106 or other similar network. The call center 100 may be, for example, a location that houses personnel who provide customer support for various companies or organizations. To this end, the call center 100 includes multiple agents that will answer customer telephone calls to provide service or support, etc. The call center 100 includes a computer network 109 that features a number of data processing devices 113 such as computers, workstations, or other similar devices. In one embodiment, the computer network 109 also includes a central server 116 that interfaces with all of the data processing devices 113. Each of the data processing devices 113 is associated with a particular agent in the call center 100.

The call center 100 also includes a private exchange (PBX) 119 that is linked to the telecommunications network 106 and serves as an internal telephone switch in the call center 100. Incoming telephone calls from customers via the PSTN 106 are received at the PBX 119 and thereafter routed to a particular agent's telephone 123 in an agent's office 126 where an agent responds appropriately.

The PBX 119 includes a state output that is linked to the central server 116. The PBX 119 informs the central server 116 of particular events that occur in the PBX 119. An event may be, for example, a telephone phone call has been received from the outside telephone 103 (denoted "DeliveredEvent") or that a telephone call has been answered at a particular agent's telephone 123 (denoted "EstablishedEvent"). Other events may include, for example, hold events and retrieve events, etc. The central server 116 and the computer network 109 react to the events received from the PBX 119 and, for example, cause appropriate information to appear on the screens of the data processing device 113 of a particular agent as well as triggering other appropriate events in the computer network 109.

There are several different makes of PBX's available on the market from multiple manufacturers that may be employed with the computer network 109. This presents a problem in that the PBX from each manufacturer generally employs a unique language or protocol in communicating the specific events to the central server 116. Consequently, for each PBX 119 made by a specific manufacturer, the software in the central server 116 must be adapted to interface with the unique language or protocol of the PBX 119.

Specific problems with the various protocols embraced by many PBXs 119 are several fold. For example, some PBXs 119 feature events that are not employed by others. Also, some have single events that loosely translate into multiple events in others. In addition, oftentimes events may occur in different temporal orders depending on the particular protocol. Further, there is a lack of uniformity in the information that is provided in the events themselves among various PBXs 119.

The present invention advantageously provides a normalized protocol that is employed with the various PBX's that are available on the market. In addition, the present invention also provides a protocol normalization system that translates from the various event protocols of the different PBX's on the market into the normalized protocol.

Figure 2:
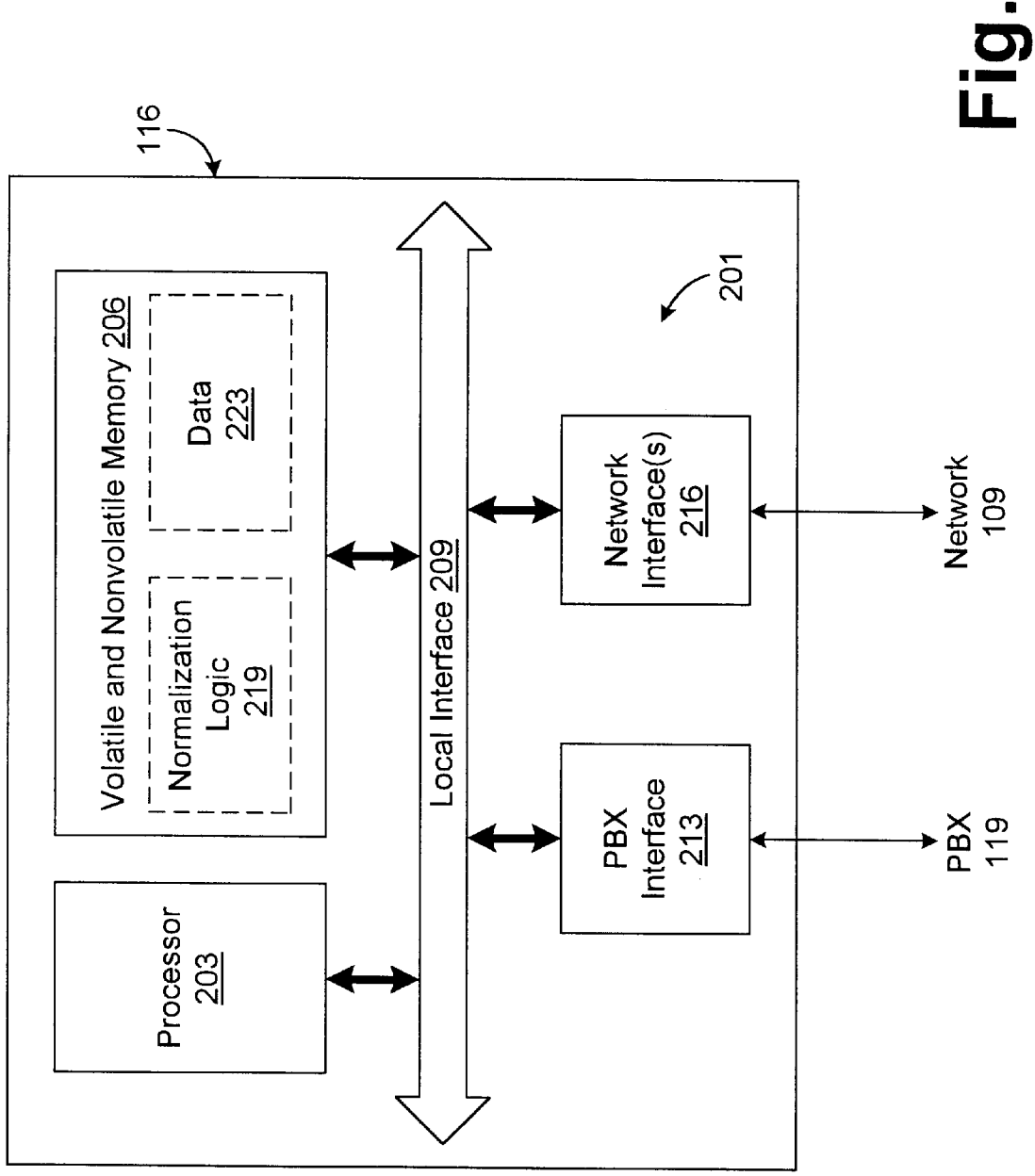
FIG. 2 is a block diagram of central server in the call center of FIG. 1.

Turning to FIG. 2, shown is a block diagram of the central server 116. According to one embodiment of the present invention, the central server 116 includes a processor circuit 201 that features a processor 203 and a volatile/nonvolatile memory 206, both of which are coupled to a local interface 209. The local interface 209 may comprise, for example, the data bus and a control bus to facilitate the transmission of data within the processor circuit 201. The central server 116 firther comprises a PBX interface 213 that receives data signals from the PBX 119 and makes them available on the local interface 209. Additionally, the central server 116 comprises a network interface 216 that allows data to be written from the local interface 209 to the computer network 109 (FIG. 1) and vice versa. Stored on the volatile/nonvolatile memory 206 is normalization logic 219 and data 223. Thus, according to one embodiment of the present invention, the normalization logic 219 is generally executed by the processor 203 that processes the data 223.

In other embodiments, the normalization logic 219 can be implemented in hardware, software, firmware, or a combination thereof. If implemented in hardware, the normalization logic 219 may comprise a dedicated circuit with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

Figure 3:
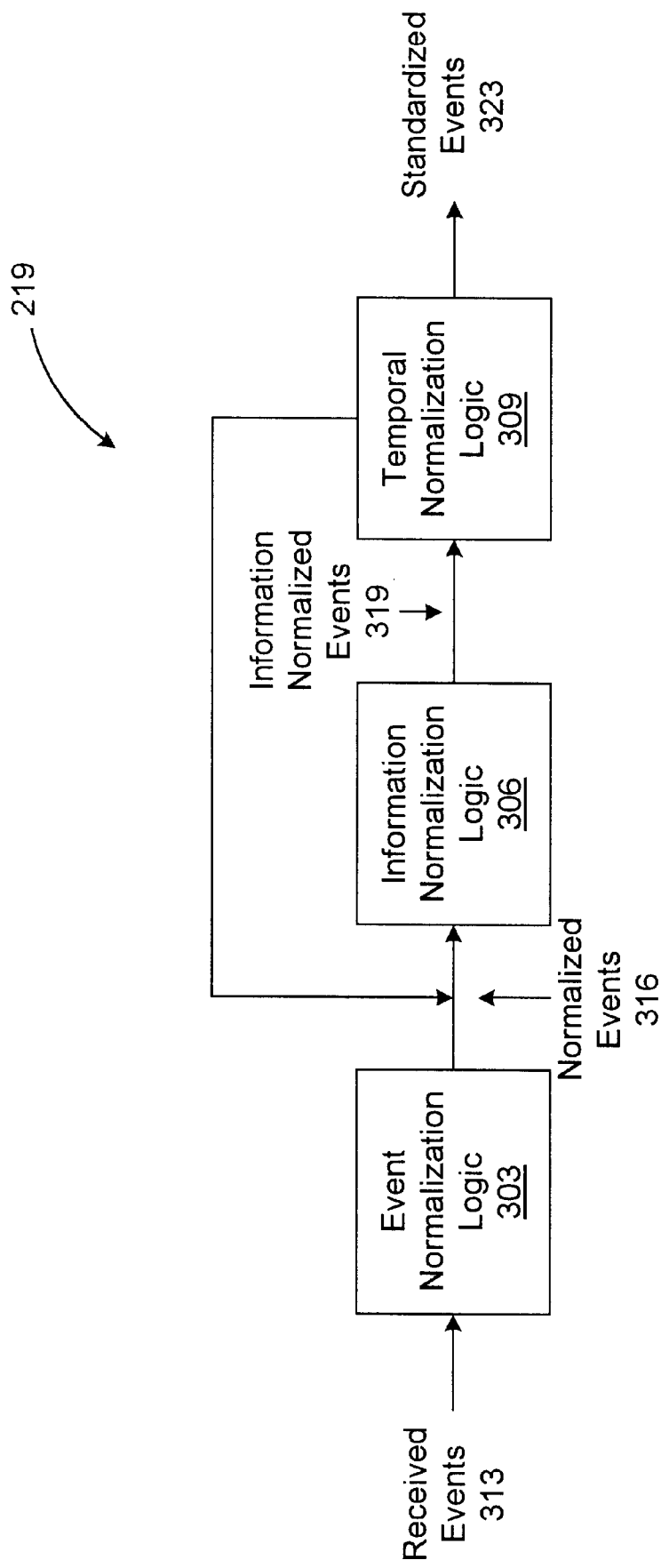
FIG. 3 is a functional block diagram of normalization logic stored and executed by the central server of FIG. 2.

With reference to FIG. 3, shown is a functional block diagram of the normalization logic 219 according to an embodiment of the present invention. The normalization logic 219 comprises three major logical components that may be, for example, software modules. These components include event normalization logic 303, information normalization logic 306, and temporal normalization logic 309. The non-standard CTI events 313 from the PBX 119 are applied to the event normalization logic 303. The output of the event normalization logic 303 includes normalized events 316 that correspond to the non-standard CTI events 313, but are in the form of a normalized protocol. The normalized protocol closely follows, with a few additions and changes, the protocol defined in the *Services for Computer Supported Telecommunication Applications* (*CSTA-II*), (ECMA-218, December 1994), which is incorporated herein by reference. The foregoing protocol is set forth by the European Computer Manufacturers Association (ECMA).

The normalized events 316 are thereafter applied to the information normalization logic 306 that generates information normalized events 319. The information normalized events 319 include information as set forth by the normalized protocol, where the normalized events 316 might have had some information missing due to the fact that such information was not provided by the corresponding non-standard CTI event 313. The information normalized events 319 are thereafter applied to the temporal normalization logic 309 that generates complete normalized events 323 therefrom. In addition, the temporal normalization logic 309 may also generate missing events that are fed back into a queue that is applied as the input to the information normalization logic 306. The specific operation of the modules discussed above is further described with reference to the figures that follow.

Figure 4:
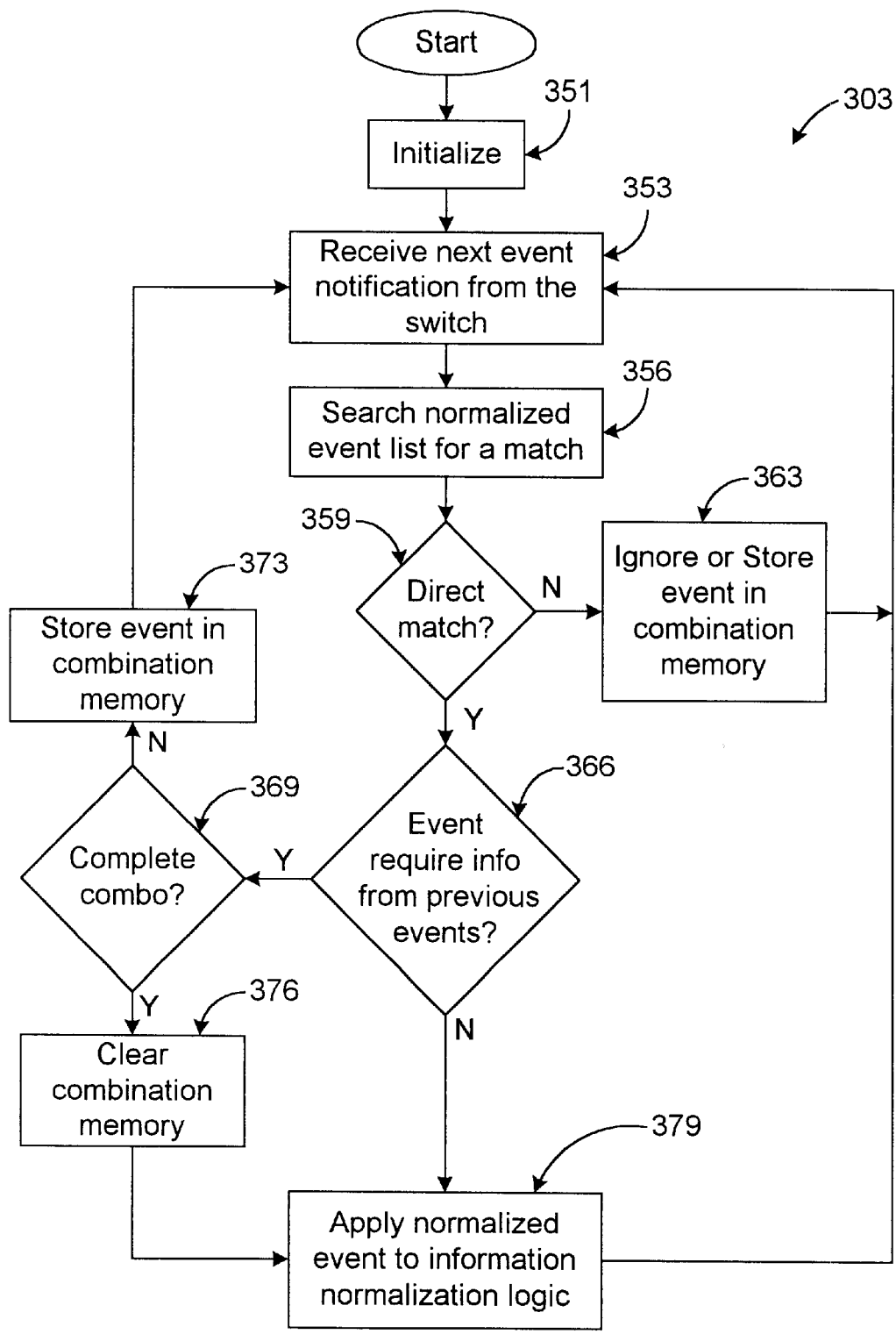
FIG. 4 is a flow chart of an event normalization logic portion of the normalization logic of FIG. 3.

Referring next to FIG. 4, shown is a block diagram of the event normalization logic 303 according to an embodiment of the present invention. Beginning with block 351, the event normalization logic 303 is initialized for operation by setting variables to beginning values as well as other initial operations. Then, the event normalization logic 303 proceeds to block 353 in which a non-standard CTI event is received from the PBX 119 (FIG. 1). Thereafter, in block 356 the event normalization logic 303 searches a list of potential non-standard CTI events stored in the volatile/nonvolatile memory 206 (FIG. 2) to find a non-standard CTI event that matches the non-standard CTI event received from the PBX 119. In many cases, each of the non-standard CTI events stored in the volatile/nonvolatile memory 206 points to a corresponding normalized event, the normalized events also being stored in the volatile/nonvolatile memory 206. The potential non-standard CTI events and the corresponding normalized events are preferably stored in nonvolatile memory to prevent loss of operation upon the occurrence of a power outage.

The event normalization logic 303 then proceeds to block 359 where it is determined whether a direct match has been found. If a direct match is not found, the event normalization logic 303 moves to block 363. On the other hand, if a direct match is found, the event normalization logic 303 progresses to block 366. Assuming that a direct match was not found, in block 363 the non-standard CTI event may be discarded if it matches one of a number of events stored in the memory 206 that are to be discarded or ignored. Otherwise, the event is stored in a combination memory location in the volatile/nonvolatile memory 206. Thereafter, the event normalization logic 303 reverts back to block 353 where the next non-standard CTI event is received from the PBX 119.

Assuming that the event normalization logic 303 progresses to block 366, then the event normalization logic 303 determines whether the current non-standard CTI event requires information from previous events such as digits dialed, etc. This is done by examining the combination memory location for previous events for the desired information. If it is determined in block 366 that the current non-standard CTI event requires further information, the event normalization logic moves to block 369 to determine whether the event may be completed by the addition information stored in the combination memory location. If the event can not be completed, then the event normalization logic 303 moves to block 373 where the current non-standard CTI event is stored in the combination memory location. Thereafter, the event normalization logic reverts back to block 353.

Conversely, if in block 369 the event can be completed by the addition information stored in the combination memory location, then the event normalization logic 303 moves to block 376 in which the information is added to the current event and the information is cleared from the combination memory location. Thereafter, the event normalization logic 303 progresses to block 379 in which a normalized event that corresponds with the identified combination is applied to the information normalization logic 306 (FIG. 3). In this manner, multiple non-standard CTI events that correspond to a specific normalized event are combined and the normalized event is generated.

Referring back to block 366, if the current non-standard CTI event is not part of a combination with previous events, then the event normalization logic 303 progresses to block 379 in which a corresponding normalized event is generated and applied to the information normalization logic 306. Thereafter, the event normalization logic reverts back to block 353 where the next non-standard CTI event is received and the process is repeated.

To illustrate the operation of the event normalization logic 303, an outgoing call scenario from an agent in the call center 100 is provided as an example. First, an agent who desires to make a call from the corresponding agent's telephones 123 to an outside telephone 103 via the private exchange 119 and the PSTN 106 picks up the receiver and takes the telephone off-hook, thereby getting a dial tone. The private exchange 119 reacts by sending an "Off-Hook (Device_ID)" event to the central server 116 for processing by the normalization logic 219. A search is performed and a corresponding matching normalized event, "ServiceInitiatedEvent(Device_ID)" is found and generated by the event normalization logic 303. Thereafter, the agent will dial the desired telephone number. The private exchange 119 reacts by transmitting a "digit dialed" event for each of the numbers dialed to the central server for processing by the normalization logic 219.

For each "digit dialed" event received, the event normalization logic 303 searches and does not find a corresponding normalized event. Since the number dialed is considered important information to be associated with the telephone call, the "digit dialed" events are stored in the combination memory location to combine with subsequent events. When the agent dials the final digit of the desired telephone number, the private exchange 119 then transmits a "Call-Progress(Device_ID, digits dialed)" event to the central server 116. The "Call-Progress(Device_ID, digits dialed)" event is applied to the normalization logic 219 to inform the central server 116 that a call is progressing through the PSTN 106 to the desired outside telephone 103 to complete the call. The event normalization logic 303 then pairs the "Call-Progress (Device_ID, digits dialed)" event with the previous "Digit Dialed" events and generates an "OriginatedEvent(Device_ID, digits dialed)" event that informs the network 109 that the dialing is complete.

Figure 5:
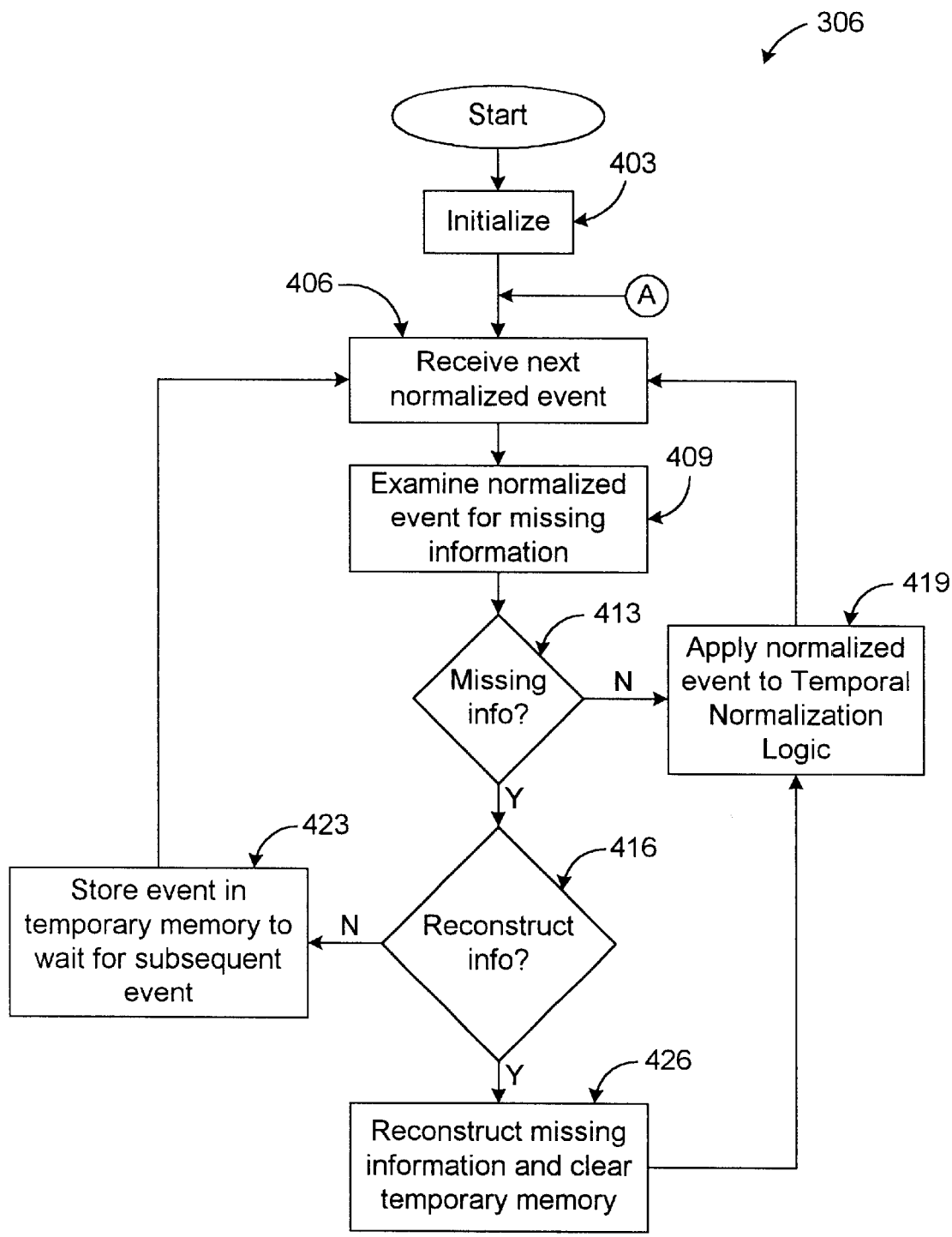
FIG. 5 is a flow chart of an information normalization logic portion of the normalization logic of FIG. 3.

Turning then to FIG. 5, shown is a block diagram of the information normalization logic 306 according to another embodiment of the present invention. The information normalization logic 306 begins with block 403 in which the information normalization logic 306 is initialized by presetting variables, etc. Thereafter, the information normalization logic 306 progresses to block 406 where a normalized event is obtained from the event normalization logic 303 as described previously. Next, the information normalization logic 306 progresses to block 409 in which the normalized event is examined for missing information. Then, in block 413, if information is missing in the normalized event, the information normalization logic 306 progresses to block 416. On the other hand, if there is no information missing in the normalized event, the information normalization logic 306 progresses to block 419. In block 419, the normalized event is applied to the temporal normalization logic 309, and, thereafter the event normalization logic 306 reverts back to block 406 to receive the next normalized event.

Referring back to block 416, once the information normalization logic 306 identifies missing information in the normalized event, it is determined whether this information can be reconstructed either from information known about the particular PBX 119 (FIG. 1) or from one or more prior normalized event(s) that are then stored in a predetermined location in the volatile/nonvolatile memory 206 (FIG. 2). If the missing information cannot be reconstructed in block 416, then the information normalization logic 306 moves to block 423 in which the normalized event with missing information is temporarily stored in the predetermined location in the volatile/nonvolatile memory 206. Thereafter, the information normalization logic reverts back to block 406 to receive the next normalized event.

However, if it is determined in block 416 that the missing information in a particular normalized event can be reconstructed, then the information normalization logic 306 progresses to block 426. In block 426 the missing information is reconstructed and the predetermined location in the memory 206 is cleared of all prior events pertaining to be reconstructed normalized event. Thereafter, the information normalization logic 306 reverts back to block 419 in which the information normalized event is applied to the temporal normalization logic 309.

To illustrate the operation of the information normalization logic 306, the outgoing call scenario from an agent in the call center 100 is described once again as an example. Once the agent's telephone 123 is taken off hook, the corresponding normalized event, "ServiceInitiatedEvent (device ID)", is generated by the event normalization logic 303 and is received by the information normalization logic 306. Thus, in the context of the information normalization logic 306, the normalized events also carry various fields that contain specific information relative to the events themselves. For example, the device_ID indicates a field in the event that indicates the particular agent's telephone that went off hook. The information normalization logic 306 then assigns a Call_ID field to the normalized event 316 that is a unique identifier for all of the events that will occur during a particular telephone call. The unique identifier is stored in memory by the information normalization logic 306 for use with subsequent events associated with the same telephone call that lacks the identifier.

When the agent dials the various digits, no corresponding normalized event 316 is generated by the private exchange as discussed previously. The normalized event 316 labeled "OriginatedEvent(Device_ID, dialed digits)" that was generated from the corresponding "Call-progress" event from the private exchange 119 by the event normalization logic 303 includes the Device_ID and the dialed digits themselves. The information normalization logic 306 recognizes that the "OriginatedEvent(Device_ID, dialed digits)" is missing the unique identifier. In response it forms an association with the earlier created unique Call_ID, resulting in the output "OriginatedEvent(Call_ID, Device_ID, dialed digits)" from the information normalization logic 306.

Figure 6:
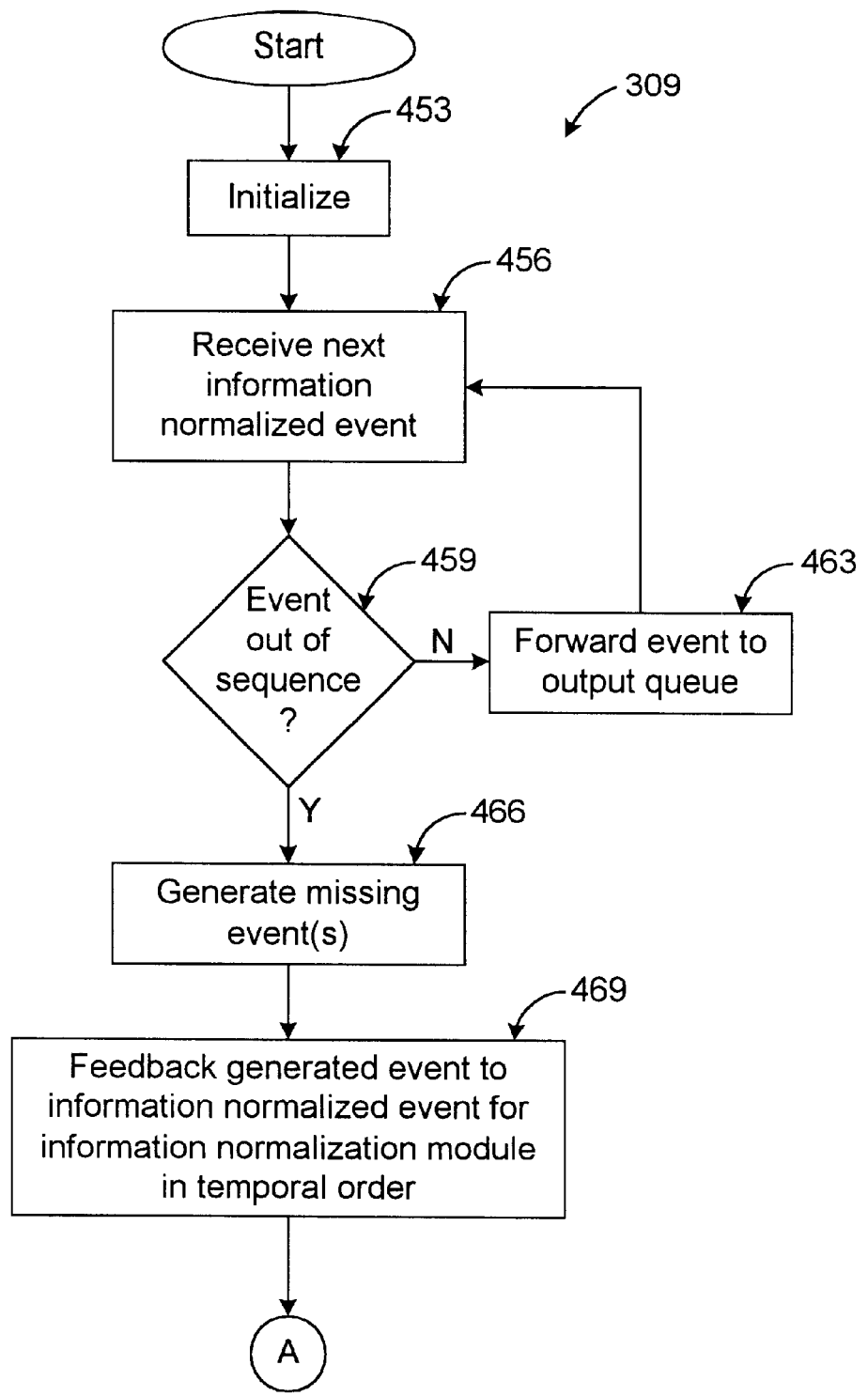
FIG. 6 is a flow chart of a temporal normalization logic portion of the normalization logic of FIG. 3.

With reference to FIG. 6, shown is a flow chart of the temporal normalization logic 309 according to another embodiment of the present invention. Beginning with block 453, the temporal normalization logic 309 is initialized by setting initial variables, etc. Thereafter, the temporal normalization logic 309 progresses to block 456 in which an information normalized event 319 (FIG. 3) is received from the information normalization logic 306 (FIG. 3). Next, the temporal normalization logic 309 moves to block 459 in which is determined whether the information normalized event 319 just received is out of sequence. If this event is not out of sequence, then the temporal normalization logic 309 moves to block 463 in which the information normalized event 319 is forwarded to an output queue from which the network 109 (FIG. 1) responds accordingly.

On the other hand, if an information normalized event 319 is received out of sequence in block 459, then temporal normalization logic 309 progresses to block 466. In block 466, missing events are generated that had not been created thereby resulting in the information normalized event 319 being received out of sequence. The temporal normalization logic 309 then progresses to block 469 in which the generated event and the out of sequence information normalized event 319 are fed back to the information normalization logic 306 to process in the correct sequence. Thereafter, the temporal normalization logic 309 ends into connector A that connects into the information normalization logic 306 to process the fed back events.

To illustrate the operation of the temporal normalization logic 306, the outgoing call scenario from an agent in the call center 100 is described once again where an outgoing call is established via one of the data processing devices 113 (FIG. 1) that may be, for example, a desktop computer. Assuming that an agent establishes a voice call from their desktop computer 113, the corresponding private exchange 119 may not generate a non-standard CTI "off-hook" event. Instead, ultimately the temporal normalization logic 309 receives an OriginatedEvent(Device_ID, dialed digits) from the information normalization logic 306 when the dialing is complete. Note that this event is not information normalized as it is missing the Call_ID information that is normally assigned upon the occurrence of a non-standard CTI Off-Hook event.

This presents a problem as there is now an OriginatedEvent without a preceding ServiceInitiatedEvent and no Call_ID information is associated with the Off-Hook event for the system to associate the event with a particular contact. The missing event or Call_ID information may prove to be problematic for components in the network 109 or the central server 116 that operate assuming that ServiceInitiatedEvent would precede the OriginatedEvent. In this situation, the temporal normalization logic 309 generates a proper ServiceInitiatedEvent(Device_ID) and then feeds it back to the information normalization logic 306 followed by the previously received OriginatedEvent(Device_ID, dialed digits). The information normalization logic 306 then assigns a proper Call_ID, saving the same for future events as discussed before, and then applies the ServiceInitiatedEvent(Call_ID, Device_ID) to the temporal normalization logic 309. Thereafter, the information normalization adds the Call_ID to the OriginatedEvent, thereby generating the OriginatedEvent(Call_ID, Device_ID, dialed digits). The OriginatedEvent(Call_ID, Device_ID, dialed digits) is then applied to the temporal normalization logic 309. Since the events are in the proper order, the temporal normalization logic 309 allows them to pass as standardized CTI events 323 to further processing modules where they are applied to other components of the central server 116 and other components on the network 109 as is proper.

As stated previously, the normalized protocol closely follows the protocol defined in the Computer Supported Telecommunication Applications (CSTA-II), set forth by the European Computer Manufacturers Association (ECMA) with a few additions and changes that will be discussed. However, several additional event services have been added that are not addressed by the CSTA-II standard. In addition to the fact that these additional event services are not included in the CSTA-II, these additional event services are added to provide abstract association and disassociation event services for PBXs 119. These abstract association and disassociation event services are configured as interactive voice response (IVR) ports and as agent devices as known in the art. Finally, these additional services are added to provide statistical data relevant to measure various stages of a telephone call.

Additional events can be categorized as one of three types: telephony events, data management events, and statistical events. The telephony events include a preview event to notify the network 109 that an outbound call is being made in a preview mode. Preview mode or a preview event is one that is generated by the normalization logic 219 to solicit the consent by an agent before making an outbound call on the agent's behalf. Accordingly, the normalization logic 219 waits for an agent to select to either proceed or abandon the call. A second telephony event includes a remote route indication event that notifies the network 109 about the expected arrival of a telephone call on a specific device to facilitate inter-site transfer between two call centers.

The data management events include a "contact created" event and a "contact completed" event. The contact created event notifies the network 109 about the introduction of a telephone call into the monitored domain of a call center. The contact completed event notifies the network 109 that a call has left the monitored domain of a call center. The data management events also include IVR association and disassociation events to notify the network 109 that an IVR port has been associated with a contact. Finally, the data management events include agent association and disassociation events to notify the network 109 that the telephone device 123 (FIG. 1) configured for a particular agent has been associated or disassociated with a contact.

The statistical events provide statistical data for a particular call. One statistical event includes a "hold time" event that notifies the network 109 about a hold time for a given telephone call. The present invention also includes an "answer time" event that notifies the network 109 about the speed of an answer for a given telephone connection. A "talk time" event notifies the network 109 about a talk time for given telephone call. The "queue time" notifies the network 109 about an amount time that a particular telephone call has been waiting in a specified calling queue. Finally, the additional statistical events include a "route time" that notifies the network 109 about the time it takes to route a telephone call to a particular agent within the call center. All the statistical events are derived by the normalization logic by performing co-relations among various normalized CTI events for a given call.

In addition, the flow chart of FIGS. 3–6 show the architecture, functionality, and operation of a possible implementation of the normalization logic or software. With respect to the embodiment of the normalization logic in software, each block represents a module, segment, or portion of code, which comprises one or more executable instructions for implementing the specified logical function (s). It should also be noted that in some alternative implementations, the functions noted in the blocks may occur out of the order noted in FIGS. 3–6. For example, two blocks shown in succession in FIGS. 3–6 may in fact be executed substantially concurrently or the blocks may sometimes be executed in the reverse order, depending upon the functionality involved, as will be further clarified hereinbelow.

Also, the software embodiment of the normalization logic 219 comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. A system for generating a number of standardized computer telephony interface (CTI) events from a number of non-standard CTI events, comprising:
   a processor coupled to a local interface;
   a memory coupled to the local interface;
   a normalization logic stored in the memory, the normalization logic being executed by the processor, the normalization logic including:
      event normalization logic to generate at least one normalized event from at least one of the non-standard CTI events;
      information normalization logic to add a missing amount of information to at least one normalized event, thereby generating an information normalized event; and
      temporal normalization logic to generate at least one missing normalized event upon detecting an out of sequence information normalized event.

2. The system of claim 1, wherein the event normalization logic further comprises logic to match the non-standard CTI event with a normalized event.

3. The system of claim 1, wherein the event normalization logic further comprises logic to match a combination of the non-standard CTI events with a normalized event.

4. The system of claim 1, wherein the information normalization logic further comprises logic to examine a normalized event for an amount of missing information.

5. The system of claim 1, wherein the temporal normalization logic further comprises logic to requeue a generated normalized event with a previously received information normalized event to be processed by the information normalization logic.

6. The system of claim 4, wherein the information normalization logic further comprises logic to reconstruct the missing information from a subsequent event.

7. The system of claim 1, wherein the event normalization logic further comprises logic to generate a preview event to solicit a consent by an agent in a call center to establish an outbound telephone call on behalf of the agent.

8. The system of claim 1, wherein the event normalization logic further comprises:
  logic to generate a contact created event that indicates that a telephone call has been introduced into a monitored domain of a call center; and
  logic to generate a contact completed event that indicates that a telephone call has left the monitored domain of the call center.

9. The system of claim 1, wherein the event normalization logic further comprises:
  logic to generate an association event indicating that a telephone device has been associated with a contact in a call center; and
  logic to generate a disassociation event indicating that a telephone device has been disassociated with a contact in a call center.

10. The system of claim 1, wherein the event normalization logic further comprises logic to generate at least one of a number of statistical events by creating a number of correlations among at least two events, the events being specific to a single telephone call.

11. A system for generating a number of standardized computer telephony interface (CTI) events from a number of non-standard CTI events, comprising:
  means for generating at least one normalized event from at least one of the non-standard CTI events;
  means for adding a missing amount of information to at least one normalized event, thereby generating an information normalized event; and
  means for generating at least one missing normalized event upon detecting an out of sequence information normalized event.

12. The system of claim 11, wherein means for generating at least one normalized event from at least one of the non-standard CTI events further comprises means for matching the non-standard CTI event with a normalized event.

13. The system of claim 11, wherein means for generating at least one normalized event from a non-standard CTI event further comprises means for matching a combination of non-standard CTI events with a normalized event.

14. The system of claim 11, wherein means for adding a missing amount of information to at least one normalized event further comprises means for examining a normalized event for an amount of missing information.

15. A method for generating a number of standardized computer telephony interface (CTI) events from a number of non-standard CTI events, comprising the steps of:
  generating at least one normalized event from at least one of the non-standard CTI events;
  adding a missing amount of information to at least one normalized event, thereby generating an information normalized event; and
  generating at least one missing normalized event upon detecting an out of sequence information normalized event.

16. The method of claim 15, wherein the step of generating at least one normalized event from at least one of the non-standard CTI events further comprises the step of matching a non-standard CTI event with a normalized event.

17. The method of claim 15, wherein the step of generating at least one normalized event from at least one of the non-standard CTI event further comprises the step of matching a combination of the non-standard CTI events with a normalized event.

18. The method of claim 15, wherein the step of generating at least one missing normalized event upon detecting an out of sequence information normalized event further comprises the step of applying a generated normalized event with a previously received information normalized event to be processed by the means for adding a missing amount of information to at least one normalized event.

19. The method of claim 15, wherein the step of adding a missing amount of information to at least one normalized event further comprises the step of examining a normalized event for an amount of missing information.

20. The method of claim 19, wherein the step of adding a missing amount of information to at least one normalized event further comprises the step of reconstructing the missing information from a subsequent event.

21. A computer program product having a computer-readable medium including computer program logic encoded thereon that, when performed on a computer system having a coupling of a memory, a processor, and at least one communications interface, provides a method for generating a number of standardized computer telephony (CTI) events from a number of non-standard CTI events by performing the operations of:
  generating at least one normalized event from at least one of the non-standard CTI events;
  adding a missing amount of information to at least one normalized event, thereby generating an information normalized event; and
  generating at least one missing normalized event upon detecting an out of sequence information normalized event.

* * * * *